United States Patent
Fell et al.

(10) Patent No.: US 7,240,533 B2
(45) Date of Patent: Jul. 10, 2007

(54) METHOD FOR REDUCING BIAS ERROR IN A VIBRATING STRUCTURE GYROSCOPE

(75) Inventors: Christopher Paul Fell, Plymouth (GB); Andrew Kazer, Taunton (GB)

(73) Assignee: BAE Systems plc, London (GB)

( * ) Notice: Subject to any disclaimer, the term of this patent is extended or adjusted under 35 U.S.C. 154(b) by 140 days.

(21) Appl. No.: 10/527,454

(22) PCT Filed: Feb. 1, 2005

(86) PCT No.: PCT/GB2005/050010

§ 371 (c)(1),
(2), (4) Date: Mar. 11, 2005

(87) PCT Pub. No.: WO2005/075939

PCT Pub. Date: Aug. 18, 2005

(65) Prior Publication Data

US 2006/0260382 A1 Nov. 23, 2006

(30) Foreign Application Priority Data

Feb. 4, 2004 (EP) .................................. 04250595
Feb. 4, 2004 (GB) .................................. 0402408.9

(51) Int. Cl.
G01P 21/00 (2006.01)
G01P 1/04 (2006.01)
G01C 25/00 (2006.01)
G01C 19/56 (2006.01)

(52) U.S. Cl. ..................... 73/1.38; 73/1.77; 73/504.12; 73/514.29

(58) Field of Classification Search .............................. 73/504.12–504.13, 1.37–1.38, 1.77, 497, 73/514.29; 74/5.6 D; 702/106; 33/318
See application file for complete search history.

(56) References Cited

U.S. PATENT DOCUMENTS 5,400,269 A 3/1995 White et al.
(Continued)

FOREIGN PATENT DOCUMENTS

EP 1 269 117 A 1/2003
(Continued)

*Primary Examiner*—Thomas P. Noland
(74) *Attorney, Agent, or Firm*—Crowell & Moring LLP

(57) ABSTRACT

A method for reducing bias error in a Vibrating Structure Gyroscope having a vibrating structure, a primary drive for putting the vibrating structure into carrier mode resonance, a primary pick-off device for sensing carrier mode motion, a secondary pick-off for sensing response mode vibration of the vibrating structure in response to applied rotation rate, a secondary drive for applying a force to control the response mode motion, closed loop primary control loops for maintaining a fixed amplitude of motion at the primary pick-off device, for maintaining the drive frequency at the resonance maximum, and secondary control loops for maintaining a null at the secondary pick-off device. In the method the ratio $SF_{QUAD}$ over $SF_{IN\text{-}PHASE}$ is measured from the secondary control loop to provide a direct measurement of $\mathrm{Sin}\,(\phi_{SD}+\phi_{PPO})$, according to the relationship $SF_{QUAD}=SF_{IN\text{-}PHASE}\times \mathrm{Sin}\,(\phi_{SD}+\phi_{PPO})$ where $SF_{QUAD}$ is the quadrature scalefactor $SF_{IN\text{-}PHASE}$ is the in-phase scalefactor, $\phi_{SD}$ is the phase error in the secondary drive and $\phi_{PPO}$ is the phase error in the primary pick-off device. The total phase error $\phi_E$ is obtained directly from the measured $\mathrm{Sin}\,(\phi_{SD}+\phi_{PPO})$ according to the relationship; $\phi_E=\phi_{SD}+\phi_{PPO}$ and phase corrections applied to the secondary drive and/or primary pick-off device to reduce the phase error $\phi_E$, and hence the quadrature bias error, to enhance the performance of the gyroscope.

9 Claims, 9 Drawing Sheets

U.S. PATENT DOCUMENTS

| | | | |
|---|---|---|---|
| 5,781,300 A * | 7/1998 | Strandjord et al. | 356/460 |
| 5,992,233 A * | 11/1999 | Clark | 73/504.12 X |
| 6,003,373 A | 12/1999 | Moore et al. | |
| 6,250,156 B1 * | 6/2001 | Seshia et al. | 73/504.12 |
| 6,296,779 B1 * | 10/2001 | Clark et al. | 216/66 |
| 7,051,590 B1 * | 5/2006 | Lemkin et al. | 73/504.12 X |
| 2003/0033850 A1 | 2/2003 | Challoner et al. | |
| 2003/0056588 A1 | 3/2003 | Fell et al. | |
| 2003/0196475 A1 * | 10/2003 | Wyse | 73/1.37 |
| 2004/0226372 A1 * | 11/2004 | Stewart | 73/504.12 |

FOREIGN PATENT DOCUMENTS

| | | |
|---|---|---|
| GB | 2322196 A * | 8/1998 |
| GB | 2 327 265 A | 1/1999 |
| GB | 2 329 471 A | 3/1999 |
| WO | WO 200177620 A1 * | 10/2001 |

* cited by examiner

Carrier

Response

METHOD FOR REDUCING BIAS ERROR IN A VIBRATING STRUCTURE GYROSCOPE

This invention relates to a method for reducing bias error in a Vibrating Structure Gyroscope which is particularly, but not exclusively, suitable for use with such gyroscopes made from silicon.

BACKGROUND OF THE INVENTION

Micro-machined Vibrating Structure Gyroscopes (VSG) are widely available at low cost. Such gyroscopes have been fabricated using a wide range of vibrating structures which include tuning forks, planar rings, beams and oscillating disk structures. The basic operating principles of all these gyroscopes are essentially the same in that the vibrating structure is driven into resonance to provide a carrier mode motion. When the structure is rotated around an axis orthogonal to the linear motion provided by the carrier mode motion, Coriolis forces are developed. These forces are directed along the remaining orthogonal axis and cause the vibrating structure to vibrate in a second mode of oscillation called the response mode. The motion of this response mode is in phase with the carrier mode motion with the amplitude being directly proportional to the applied rotation rate.

Such Vibrating Structure Gyroscopes are suitable for use in a wide range of high volume applications such as in the automotive field for automatic braking systems, roll over prevention and car navigation. The low cost and small size of these Vibrating Structure Gyroscopes makes them attractive for other uses such as inertial navigation and platform stabilisation. However their use in the latter applications has been limited by the restricted performance that can be achieved, particularly in terms of bias stability (output in the absence of an applied rate). It is necessary to achieve improved performance from these Vibrating Structure Gyroscopes to make them suitable for applications requiring greater accuracy.

A major limitation which restricts the performance of vibrating structure Coriolis gyroscopes is quadrature bias error. Quadrature bias errors arise due to the imperfections in the geometry of the vibrating structure. These imperfections cause oscillation of the response mode which is in phase quadrature (i.e. has a 90° phase relationship) to the motion induced by applied rotation rates, and may be present even when the gyroscope is not rotating. The magnitude of these signals may also be large in comparison to the required in-phase signal which provides the rotation rate information. Recovering the required rotation induced signal in the presence of a large quadrature signal places stringent requirements on the phase accuracy of the detection system. Accurately phased electronics enable the quadrature signal to be substantially rejected. However practical limitations on the accuracy with which this phasing can be set mean that some of this signal will typically remain to contaminate the true rotation induced in-phase signal. This limitation is a major source of error for this type of Vibrating Structure Gyroscope.

There is therefore a need for a method for further minimising the impact of quadrature error on vibrating structure Coriolis gyroscope performance.

SUMMARY OF THE INVENTION

According to one aspect of the present invention there is provided a method for reducing bias error in a Vibrating Structure Gyroscope having a vibrating structure, primary drive means for putting the vibrating structure into carrier mode resonance, primary pick-off means for sensing carrier mode motion, secondary pick-off means for sensing response mode vibration of the vibrating structure in response to applied rotation rate, secondary drive means for applying a force to control the response mode motion, closed loop primary control loops for maintaining a fixed amplitude of motion at the primary pick-off means and for maintaining the drive frequency at the resonance maximum, and secondary control loops for maintaining a null at the secondary pick-off means, in which the ratio $SF_{QUAD}$ over $SF_{IN-PHASE}$ is measured from the secondary control loop to provide a direct measurement of $\operatorname{Sin}(\phi_{SD}+\phi_{PPO})$, according to the relationship;

$$SF_{QUAD}=SF_{IN-PHASE} \times \operatorname{Sin}(\phi_{SD}+\phi_{PPO})$$

where $SF_{QUAD}$ is the quadrature scale factor, $SF_{IN-PHASE}$ is the in-phase scale factor, $\phi_{SD}$ is the phase error in the secondary drive means and $\phi_{PPO}$ is the phase error in the primary pick-off means, the total phase error $\phi_E$ is obtained directly from the measured Sin $(\phi_{SD}+\phi_{PPO})$ according to the relationship;

$$\phi_E=\phi_{SD}+\phi_{PPO}$$

and phase corrections applied to the secondary drive means and/or primary pick-off means to reduce the phase error $\phi_E$ and hence the quadrature bias error to enhance the performance of the gyroscope.

In this way the phase response of the control electronics may be accurately adjusted precisely to null the breakthrough of the contaminating quadrature signal on to the in-phase rate sensing channel to provide significant performance enhancement.

The method may be used with a gyroscope having a silicon vibrating structure particularly one having a substantially planar, substantially ring-shaped vibrating structure.

Preferably, when the method is used with a gyroscope having analogue primary and secondary control loops with variable value capacitors, the phase corrections are applied by varying the values of the variable value capacitors in the secondary control loop relating to the secondary drive means and/or the values of the variable value capacitors in the primary control loop relating to the primary pick-off means to adjust $\phi_{SD}$ and/or $\phi_{PPO}$ such that $\phi_E$ is minimised in value, as near to zero as possible.

Conveniently when the method is used with a gyroscope having digital primary and secondary control loops, the phase corrections equal to $\phi_E$ are applied to the secondary drive means via the secondary control loop in a manner such as to cross-couple in-phase and quadrature drive channels by an amount equal and opposite to the combined effect of the phase errors in the vibrating structure control system.

Alternatively when the method is used with a gyroscope having digital primary and secondary control loops the phase corrections equal to $\phi_E$ are applied to the primary pick-off means via the primary control loop in a manner such as to cross-couple in-phase and quadrature drive channels by an amount equal and opposite to the combined effect of the phase errors in the vibrating structure control system.

Conveniently in-phase and quadrature signal components are each multiplied by Sin $\phi_{CORR}$ and Cos $\phi_{CORR}$, where $\phi_{CORR}$ is the phase correction, and the effective phase of each in-phase and quadrature channel adjusted according to the summations $$\text{Quadrature}_{CORR}=\text{Quadrature} \times \text{Cos } \phi_{CORR}+\text{In-phase} \times \text{Sin } \phi_{CORR}$$

and $$\text{In-phase}_{CORR}=\text{In-phase} \times \text{Cos } \phi_{CORR}-\text{Quadrature} \times \text{Sin } \phi_{CORR}.$$

Advantageously $\phi_{CORR}$ is adjusted in accordance with operating temperature of the gyroscope to maintain $\phi_E$ at a minimised value.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE INVENTION

The method of the present invention for reducing bias error in a Vibrating Structure Gyroscope will be described with reference to a Coriolis gyroscope design using a substantially planar substantially ring shaped vibrating structure operating in a closed loop configuration. It is to be understood that this method may be applied to any vibrating structure operated in such a closed loop configuration.

Figure 1A:
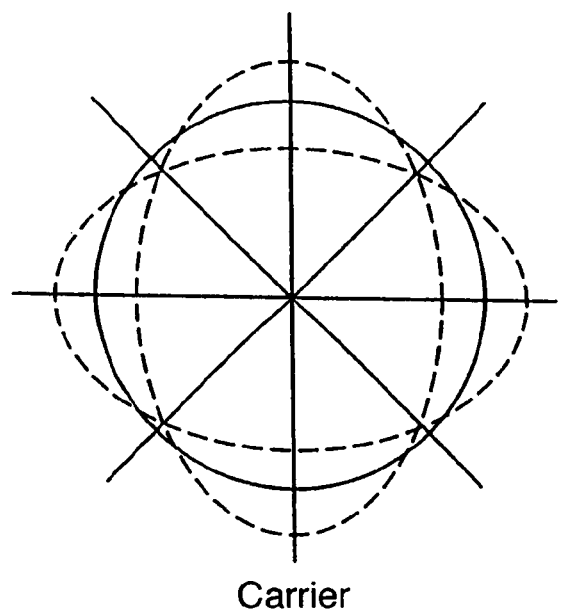
FIG. 1a is a schematic representation of a Cos 2θ carrier vibration mode not according to the present invention.
Figure 1B:
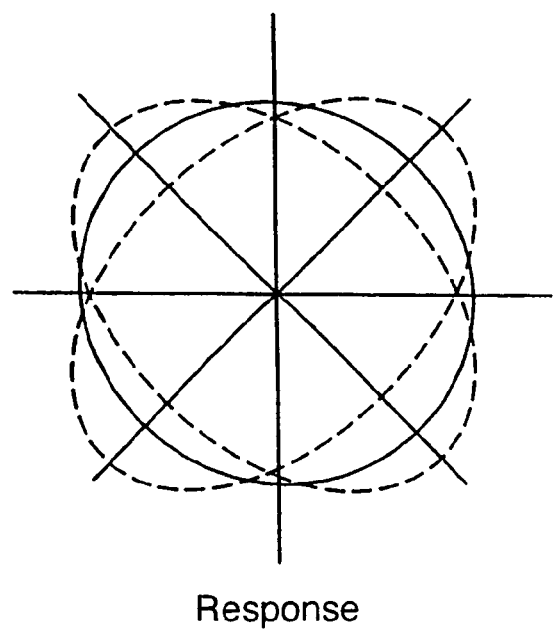
FIG. 1b is a schematic representation of a Sin 2θ response vibration mode not according to the present invention.

GB Patent 2322196 describes a Vibrating Structure Gyroscope which may be fabricated using micro-machining techniques and which is suitable for use in high reliability, high volume applications. The Vibrating Structure Gyroscope consists primarily of a crystalline silicon planar ring vibrating structure externally mounted on eight compliant support legs to an external frame (not shown). This gyroscope is typically driven in Cos 2θ vibration modes as shown schematically in FIGS. 1a and 1b. One mode as shown in FIG. 1a is excited as the carrier mode. When the gyroscope is rotated around the axis normal to the plane of the ring vibrating structure Coriolis forces $F_C$, are developed which couple energy into the response mode shown in FIG. 1b. The magnitude of the force is given by;

$$F_C = 2MV\Omega_{APP} \qquad (1)$$

where M is the modal mass, v is the effective velocity and $\Omega_{app}$ is the applied rotation rate. The carrier mode vibration amplitude is typically maintained at a fixed level. This also maintains the velocity, v, at a fixed level and hence ensures that the developed Coriolis forces are directly proportional to the rotation rate, $\Omega_{app}$. The amplitude of the motion induced by these Coriolis forces may be enhanced by accurately matching the resonant frequencies of the carrier and response modes. The motion is then amplified by the Q of the response mode giving enhanced device sensitivity. When operating in an open loop mode the sensitivity (scale-factor) of the gyroscope will be dependent on the Q of the secondary mode, which may vary significantly over the operating temperature range. This dependence may be eliminated by operating the device in closed loop (force feedback) mode. In this mode the induced response mode motion is actively nulled with the applied force required to achieve this now being directly proportional to the rotation rate.

Figure 2:
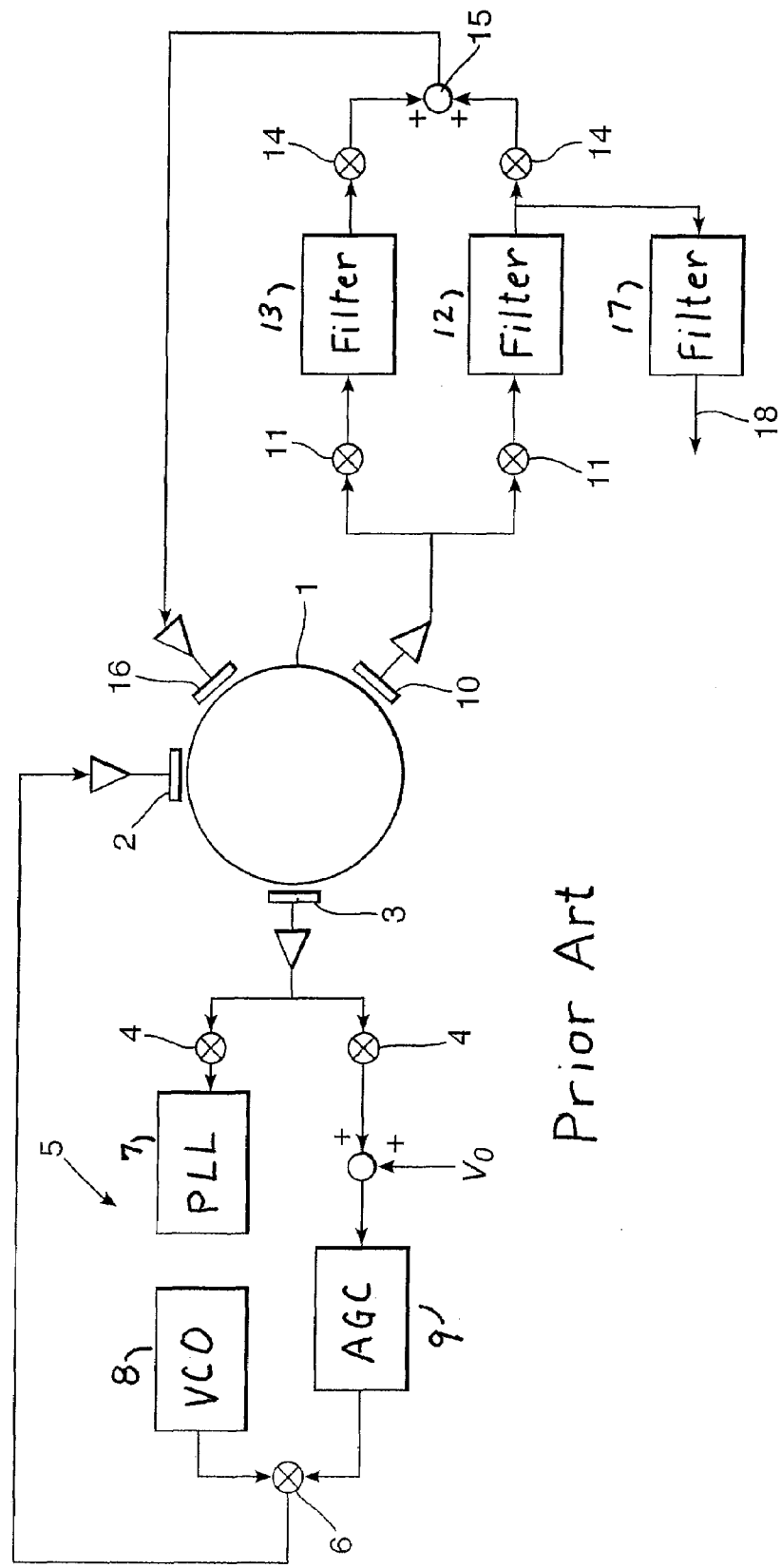
FIG. 2 is a schematic block diagram of a conventional control system for a Coriolis Vibrating Structure Gyroscope not according to the present invention.

Closed loop operation may typically be implemented using conventional prior art control loops as shown schematically in FIG. 2. In FIG. 2 the ring shaped vibrating structure 1 is excited into carrier mode resonant motion by a primary drive means 2 which motion is detected by primary pick-off means 3. The signal detected at 3 is demodulated at demodulators 4 prior to application to the carrier mode control loops 5 and re-modulated at re-modulator 6 before application to the primary drive means 2. The carrier mode control loops 5 include a phase locked loop 7 which compares the relative phases of the primary pick-off and primary drive signals and adjusts the frequency of a voltage controlled oscillator 8 to maintain a 90° phase shift between the applied drive and vibrating structure motion. This maintains the motion at the resonance maximum. The primary pick-off signal is also applied to an automatic gain control loop 9 which compares the primary pick-off signal level to a fixed reference level $V_\theta$. The primary drive level is adjusted accordingly in order to maintain a fixed signal level and hence amplitude of motion of the vibrating structure 1 at the primary pick-off means 3.

The response mode motion of the vibrating structure 1 is detected at secondary pick-off means 10. The output signal from means 10 is demodulated at demodulators 11 to separate the in-phase and quadrature components of this signal with the in-phase component being passed to an in-phase loop 12 and with the quadrature component of this signal being passed to a quadrature loop 13. The in-phase component is that which is at the same phase as the carrier mode motion. The Coriolis forces induced by applied rotation rates will generate motion with both in-phase and quadrature components. The quadrature component is an error term which arises due to the mode frequencies not being precisely matched. Loop filtering is applied to these demodulated base band DC signals by the loops 12 and 13 to achieve the required system performance such as bandwidth etc. The resultant signals are then remodulated at remodulators 14 and summed together by an adder 15 for application to secondary drive means 16 in order to maintain a null at the secondary pick-off means 10. The in-phase baseband signal, which is directionally proportional to the in-phase component of the response mode drive applied to the vibrating structure 1 via the secondary drive means 16 is scaled and filtered at filter 17 to produce a rate output signal 18.

For this mode of operation the scalefactor in response to an applied rotation rate, is given by:

$$SF_{RATE} = \frac{G_B V_O \omega}{k g_{ppo} g_{SD}} \quad (2)$$

where $V_O$ is the primary mode amplitude set level, $\omega$ is the primary mode resonance frequency, k is a constant including the resonator dimensions, $G_B$ is the Bryan factor (modal coupling coefficient), $g_{PPO}$ is the primary pick-off gain and $g_{SD}$ is the secondary drive gain.

Figure 3:
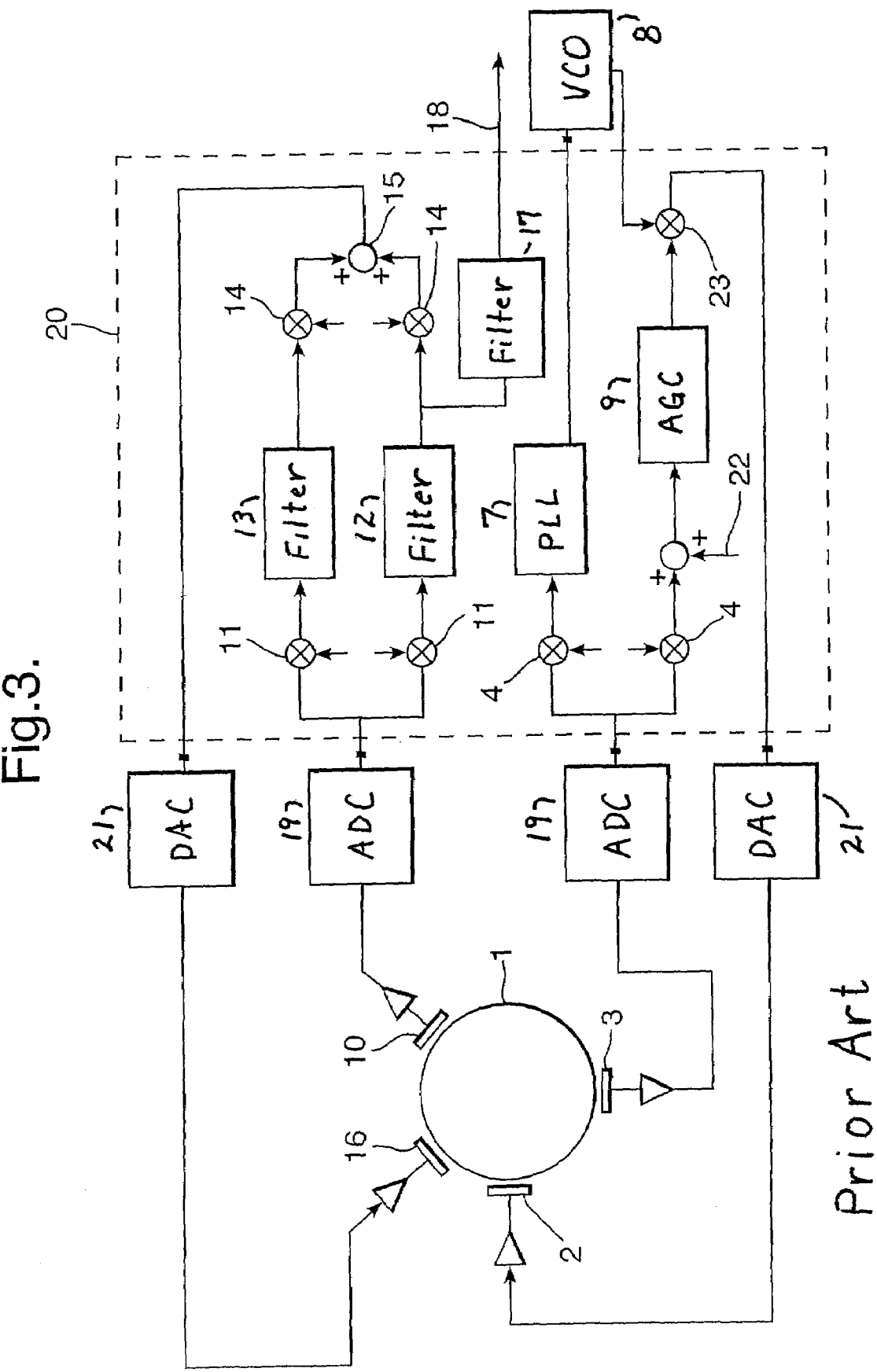
FIG. 3 is a schematic block diagram of a digital control system for a Coriolis Vibrating Structure Gyroscope not according to the present invention.

The Vibrating Structure Gyroscope described in GB 2322196 may also be used in conjunction with a digital electronic control system such as described in GB 2329471. This conventional digital electronic control system is shown in FIG. 3 of the accompanying drawings where like components previously described in respect of FIG. 2 will be given like reference numerals and not further described in detail. For this implementation signals from the primary and secondary pick-off means 3 and 10 respectively, are digitised directly at analogue to digital converters 19. The demodulation is then implemented in software 20 for both the in-phase and quadrature channels. The phase locked loop 7 and automatic gain control loop 9 functions are implemented as software functions. A digital control word is generated to drive the analogue voltage control oscillator 8 circuit at the carrier mode resonant frequency which controls the timing of the modulation and drive updates. The loop filters 12 and 13 respectively for the in-phase and quadrature channels of the secondary mode are also implemented in software 20. The drive levels to be applied to the primary and secondary drive means 2, 16 are calculated in the software algorithms and applied via digital to analogue converters 21. The secondary in-phase channel signal is filtered by the output filter 17 to give the appropriate characteristics for the rate output signal 18. In FIG. 3 the automatic gain control set level input is shown at 22.

In an ideal case, that is with perfectly phased electronics and identical carrier and response mode frequencies for the vibrating structure 1, there will be no motion detected at the secondary pick-off means 10 when the gyroscope is not rotating. In reality, small geometric imperfections, arising during the gyroscope fabrication process, will give rise to a small splitting of the mode frequencies. This splitting will also tend to fix the angular position of the modes at an arbitrary angle, $\alpha$, with respect to the primary drive means 2. When $\alpha$ is not equal to 0° the primary drive force will excite both modes to some extent. The phase locked loop 7 will adjust the drive frequency to achieve a 90° phase shift between the applied drive and the vibrating structure motion, as detected by the primary pick-off means 3. However significant motion will exist along the secondary axis which will be predominantly in quadrature phase with respect to the primary motion. In a closed loop system this motion will be nulled by a quadrature force component applied by the secondary drive means 16.

The quadrature drive level required to null this signal is referred to as the quadrature bias and is defined as:

$$\Omega_{QUAD} = K \times \Delta F \times \sin 4\alpha \quad (3)$$

where $\Delta F$ is the mode frequency split, $\alpha$ is the mode angle with respect to the primary drive axis and K is a constant including terms for the modal coupling coefficient and the secondary drive and primary pick-off gains.

$\Omega_{QUAD}$ can be large in comparison to the rate signals that the gyroscope is required to measure. A typical rate measurement range for an automotive gyro of this type is ±100°/sec. The quadrature bias may be large (>±100°/sec) in comparison to the rate signal and may vary significantly over the operating temperature range. Where a phase error, $\phi_E$, exists a small proportion of this signal will appear on the rate channel. This will give rise to a rate bias error, $\Omega_{Err}$, which is given by:

$$\Omega_{Err} = K \times \Delta F \times \sin 4\alpha \times \sin \phi_E \quad (4)$$

Even relatively small phase errors can give rise to significant bias errors. A 0.5 degree phase error will result in a 0.87 deg/sec bias on the rate output for a 100°/sec quadrature bias signal. Any temperature variation in the quadrature signal or the phase error itself will cause this bias to vary which will severely limit the accuracy and stability of the gyro. In practical systems these phase errors can arise due to a number of factors including limitations of the accuracy of circuit component values (e.g. capacitors), rise times in drive amplifiers and variations in resonator operating frequency.

Achieving this level of accuracy and stability over temperature is quite challenging in any practical electronic control system. It is also extremely difficult and time consuming to measure phase shifts to this level of accuracy using conventional techniques and equipment. It is therefore not possible to significantly reduce the rejection ratio of the quadrature bias in conventional MEMS Coriolis gyroscope systems in a cost effective manner.

Accurate measurement of the magnitude of the phase error, $\phi_E$, is possible using information available on the secondary quadrature drive channel. This measurement is not typically recorded as a gyroscope output but can be observed relatively easily, particularly when using the digital control loops of GB 2329471. Any variation in this signal when the gyroscope is rotated is indicative of a phase error. The origin of this effect is described below.

The phase error, $\phi_E$, is measured with respect to the primary resonance motion. The phase locked loop 7 locks on to the primary motion, as measured by the primary pick-off means 2 and provides a logic signal which acts as a reference to control the phasing/timing of the demodulation and re-modulation processes for both the in-phase and quadrature channels. When the gyroscope is rotated a Coriolis force is developed which is in-phase with the primary motion. In a perfect system this force is directly nulled by an in-phase force component applied via the secondary drive means 16. A phase error, $\phi_{SD}$, in the secondary drive means 16 will therefore result in some of the signal required to generate the nulling force appearing in the quadrature channel. Similarly, a phase error in the primary pick-off means 3, $\phi_{PPO}$, will give rise to an error in the timing of the reference logic signal in the electronics which will propagate into the secondary loops effectively cross-coupling the in-phase and quadrature channels. The secondary pick-off signal is maintained at a null by the force feedback and therefore the accuracy of this phase response is of less concern. A primary drive phase error will result in the primary oscillation frequency being slightly away from the resonance maximum. While this will introduce a small reduction in the drive gain this will not effect the bias as the phasing is referred back to the primary resonance motion. Phase errors in the secondary pick-off and primary drive will not give rise to bias errors and are therefore of less concern.

The rate dependence of the quadrature signal is given by:

$$SF_{QUAD} = SF_{IN-PHASE} \times \sin(\phi_{SD} + \phi_{PPO}) \quad (5)$$

Measurement of the ratio of the in-phase and quadrature scalefactors therefore gives a direct measurement of sin ($\phi_{SD}+\phi_{PPO}$) from which the total phase error ($\phi_E = \phi_{SD} + \phi_{PPO}$), can be obtained directly. Measurement of the total phase error using this technique has the advantage that it can be performed on a completed gyroscope assembly without the requirement for any additional equipment or mechanical test procedures. The normal calibration procedure for any Coriolis gyroscope requires the assembly to be rotated at a range of known rotation rates on a rate table. This procedure provides a measurement of the rate scalefactor, $SF_{RATE}$, and allows this parameter to be adjusted to a pre-set value using well known techniques. Simply recording the data available on the quadrature channel provides a measurement of $SF_{QUAD}$ and hence $\phi_E$.

Thus the method of the present invention for reducing bias error in a Vibrating Structure Gyroscope having a vibrating structure 1, primary drive means 2 for putting the vibrating structure 1 into carrier mode resonance, primary pick-off means 3 for sensing carrier mode motion, secondary pick-off means 10 for sensing response mode vibration of the vibrating structure 1 in response to applied rotation rate, closed loop primary control loops for maintaining a fixed amplitude of motion at the primary pick-off means 3 and for maintaining the drive frequency at the resonance maximum, and secondary control loops for maintaining a null at the secondary pick-off means 10, includes the steps of measuring the ratio $SF_{QUAD}$ over $SF_{IN-PHASE}$ from the secondary control loop to provide a direct measurement of Sin ($\phi_{SD} + \phi_{PPO}$) according to the relationship (5) given above where $SF_{QUAD}$ is the quadrature scale factor, $SF_{IN-PHASE}$ is the in-phase scale factor, $\phi_{SD}$ is the phase error in the secondary drive means 16 and $\phi_{PPO}$ is the phase error in the primary pick-off means 3. The total phase error $\phi_E$ is obtained directly from the measured Sin ($\phi_{SD}+\phi_{PPO}$) according to the relationship;

$$\phi_E = \phi_{SD} + \phi_{PPO} \text{ as given above}$$

and phase corrections are applied to the secondary drive means 16 and/or primary pick-off means 3 to reduce the phase error $\phi_E$ and hence the quadrature bias error to enhance the performance of the gyroscope.

When the method of the present invention is used for the gyroscope having analogue primary and secondary control loops with variable value capacitors (not shown) the phase corrections are applied by varying the values of the variable value capacitors in the secondary control loop relating to the secondary drive means 16 and/or the values of the variable value capacitors in the primary control loop relating to the primary pick-off means 3 to adjust $\phi_{SD}$ and/or $\phi_{PPO}$ such that $\phi_E$ is minimised in value. Thus as the requirement is for $\phi_E = 0$ this can be conveniently achieved by adjusting either $\phi_{SD}$ or $\phi_{PPO}$ provided $$\phi_{SD} + \phi_{PPO} = 0.$$

Figure 4:
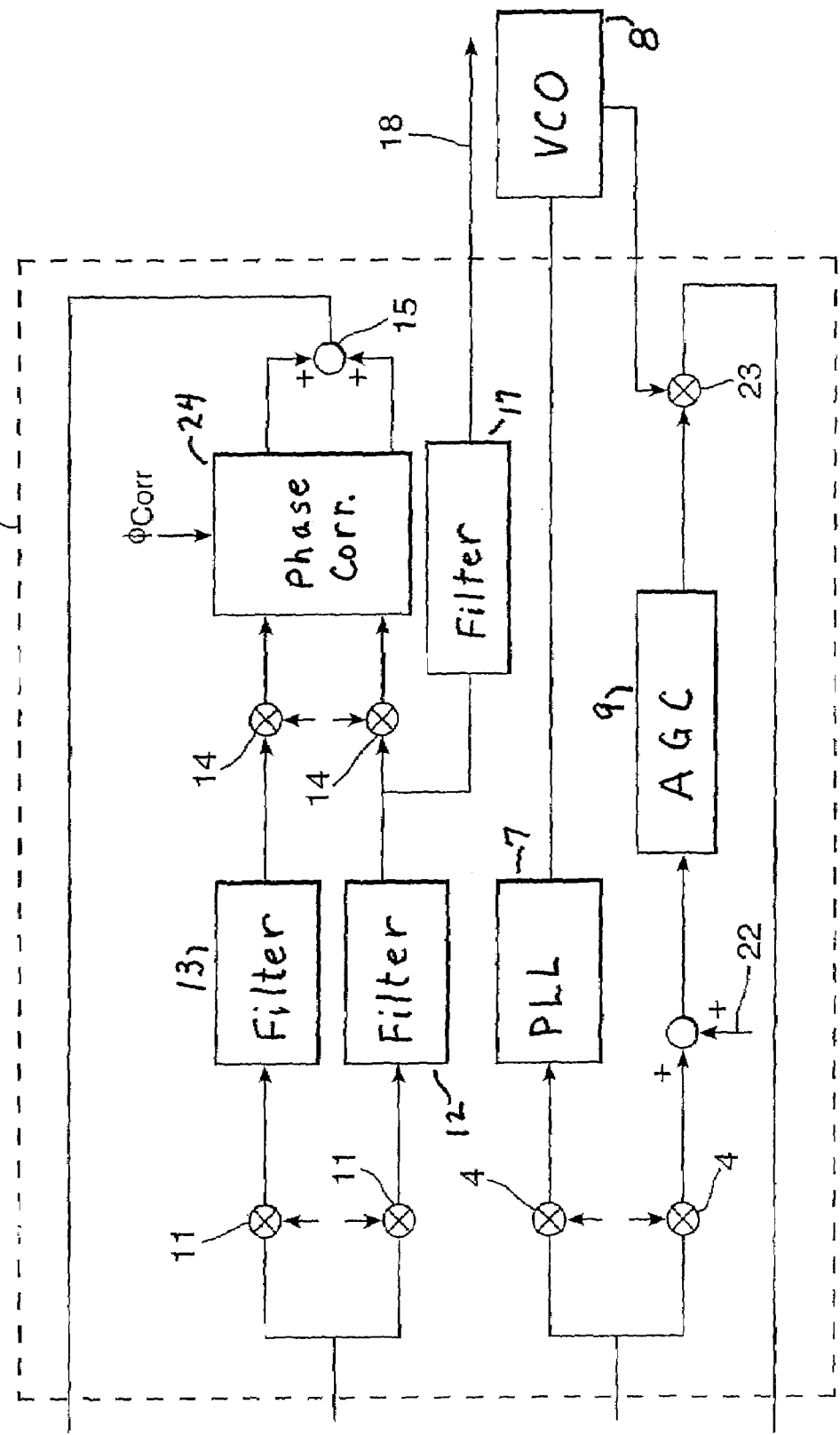
FIG. 4 is a schematic block diagram of a digital control system for a Coriolis Vibrating Structure Gyroscope incorporating the ability to adjust the effective secondary drive phase within the software, according to the present invention.

Adjustment of $\phi_E$ is more easily accomplished using the digital electronic control system of GB 2322196. A phase correction can be introduced within the software of the control loop algorithms as shown schematically in FIG. 4 where the correction is applied to the secondary drive means 16. Again in FIG. 4 parts previously shown in FIGS. 2 and 3 and previously discussed will be given like reference numerals and not specifically described in further detail. Thus in this context in the method of the present invention when used with a gyroscope having digital primary and secondary control loops the phase corrections equal to $\phi_E$ are applied to the secondary drive means 16 via the secondary control loop in a manner such as to cross-couple in-phase and quadrature drive channels by an amount equal and opposite to the combined effect of the phase errors in the vibrating structure 1. In the FIG. 4 arrangement $\phi_{CORR}$ is applied to a phase correction unit 24 connected between the remodulators 14 and the adder 15. A further remodulator 23 is located between the voltage controlled oscillator 8 and the automatic gain control filter 9.

Figure 5:
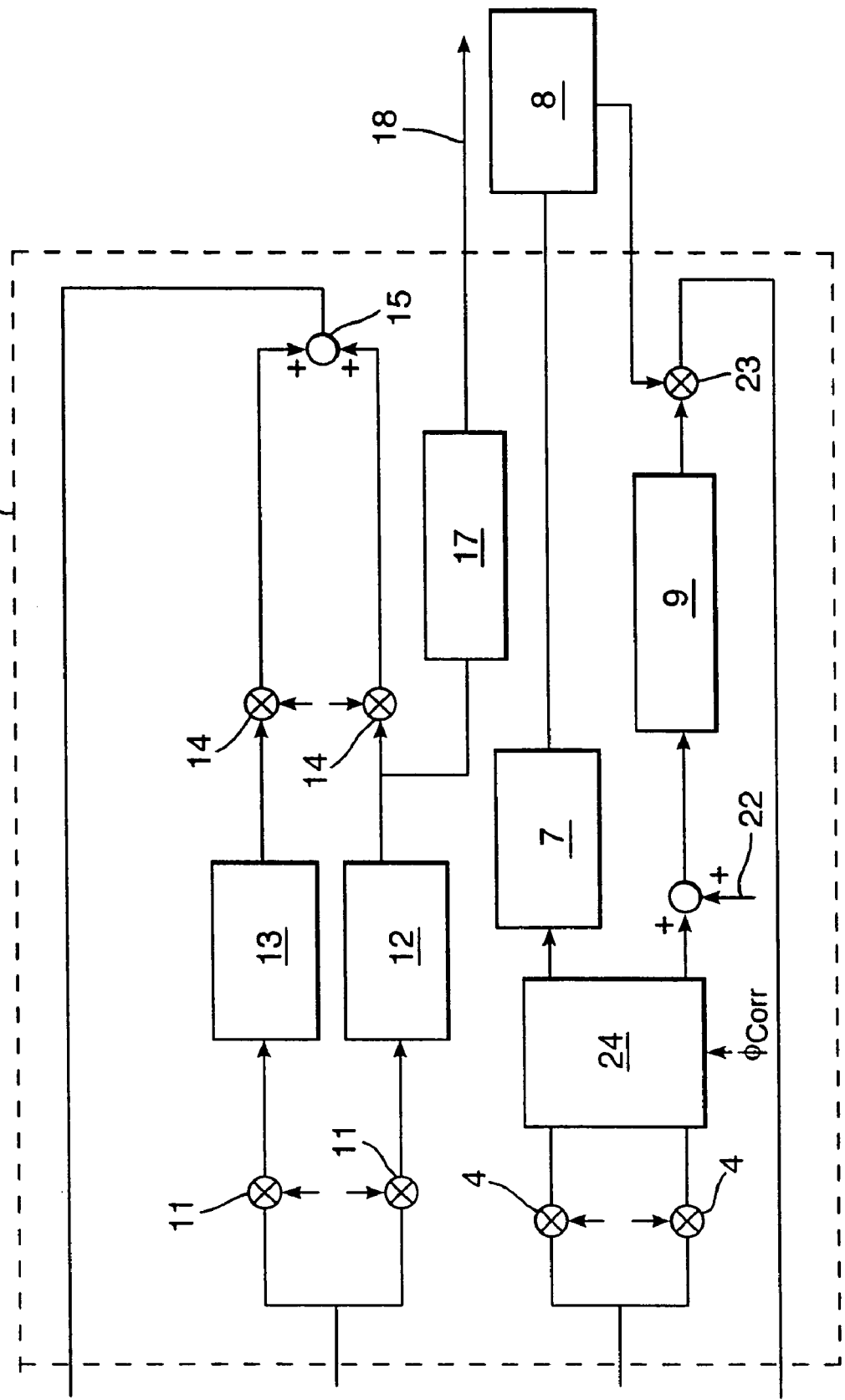
FIG. 5 is a schematic block diagram of a digital control system for a Coriolis Vibrating Structure Gyroscope incorporating the ability to adjust the effective primary pick-off phase within the software, according to the present invention.

This correction can alternatively be applied to the primary pick-off means 3 as shown in FIG. 5 in which like components previously described and referenced will be given like reference numerals and not described further in detail. In the FIG. 5 arrangement the phase correction unit 24 is located in the primary control loop for application to the primary pick-off means 3 so as to cross-couple in-phase and quadrature drive channels by an amount equal and opposite to the combined effect of the phase errors in the vibrating structure 1. To this end the phase correction unit 24 is located between the quadrature and in-phase demodulators 4 and the phase locked loop filter 7 and automatic gain control loop filter 9 as shown in FIG. 5.

Figure 6:
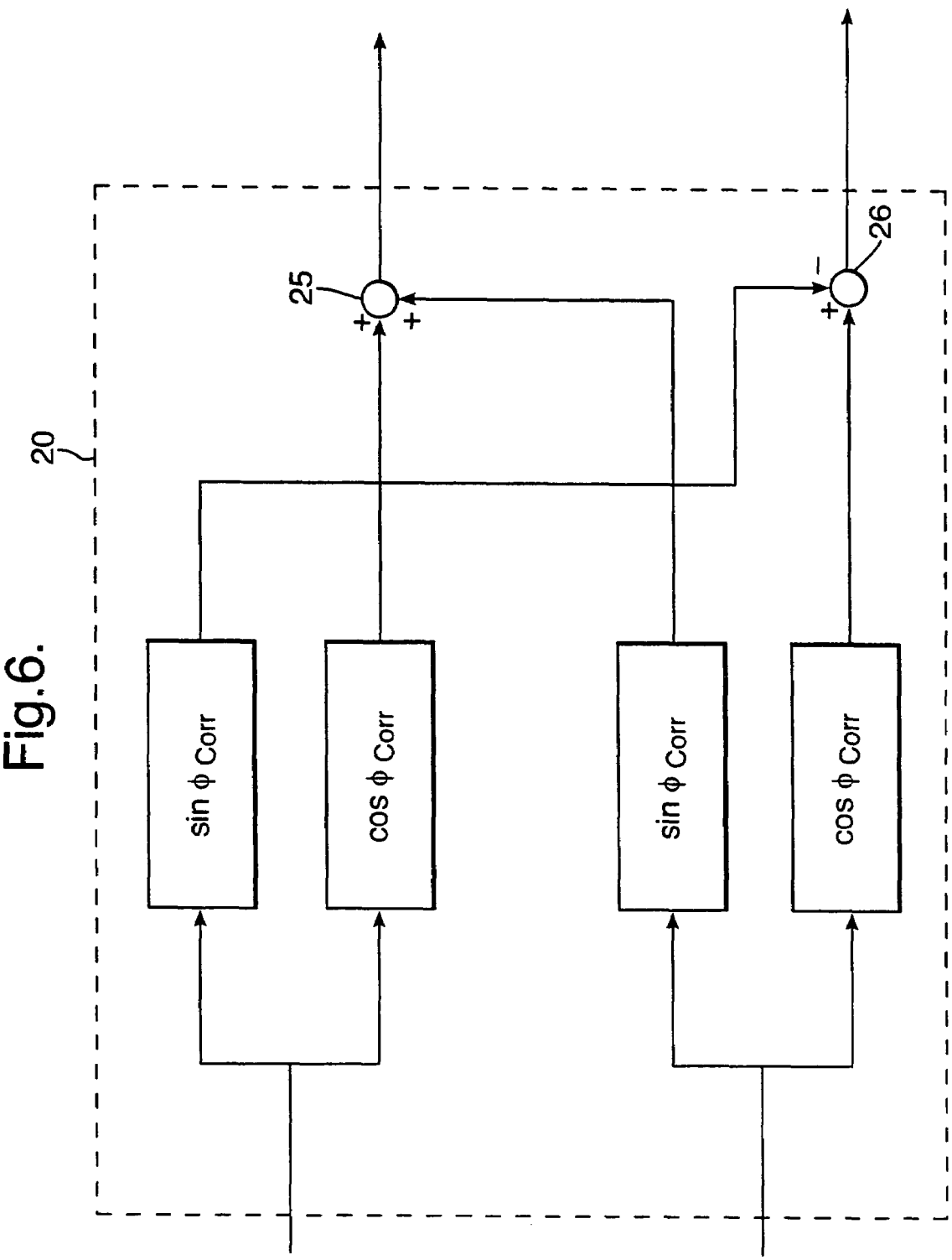
FIG. 6 is a schematic block diagram illustrating the functionality of the phase correction block of FIGS. 4 and 5.

The functionality of the phase correction is shown in FIG. 6 in which again like features previously described have been given like reference numerals and will not be further described in detail. An adder 25 and a differencer 26 are included.

When applied on the secondary drive, the in-phase and quadrature components are each multiplied by sin $\phi_{CORR}$ and cos $\phi_{CORR}$ and the effective phase of each channel adjusted by applying the following summations:

$$\text{Quadrature}_{CORR} = \text{Quadrature} \times \cos \phi_{CORR} + \text{In-Phase} \times \sin \phi_{CORR} \quad (6)$$

$$\text{In-Phase}_{CORR} = \text{In-Phase} \times \cos \phi_{CORR} - \text{Quadrature} \times \sin \phi_{CORR} \quad (7)$$

Figure 7:
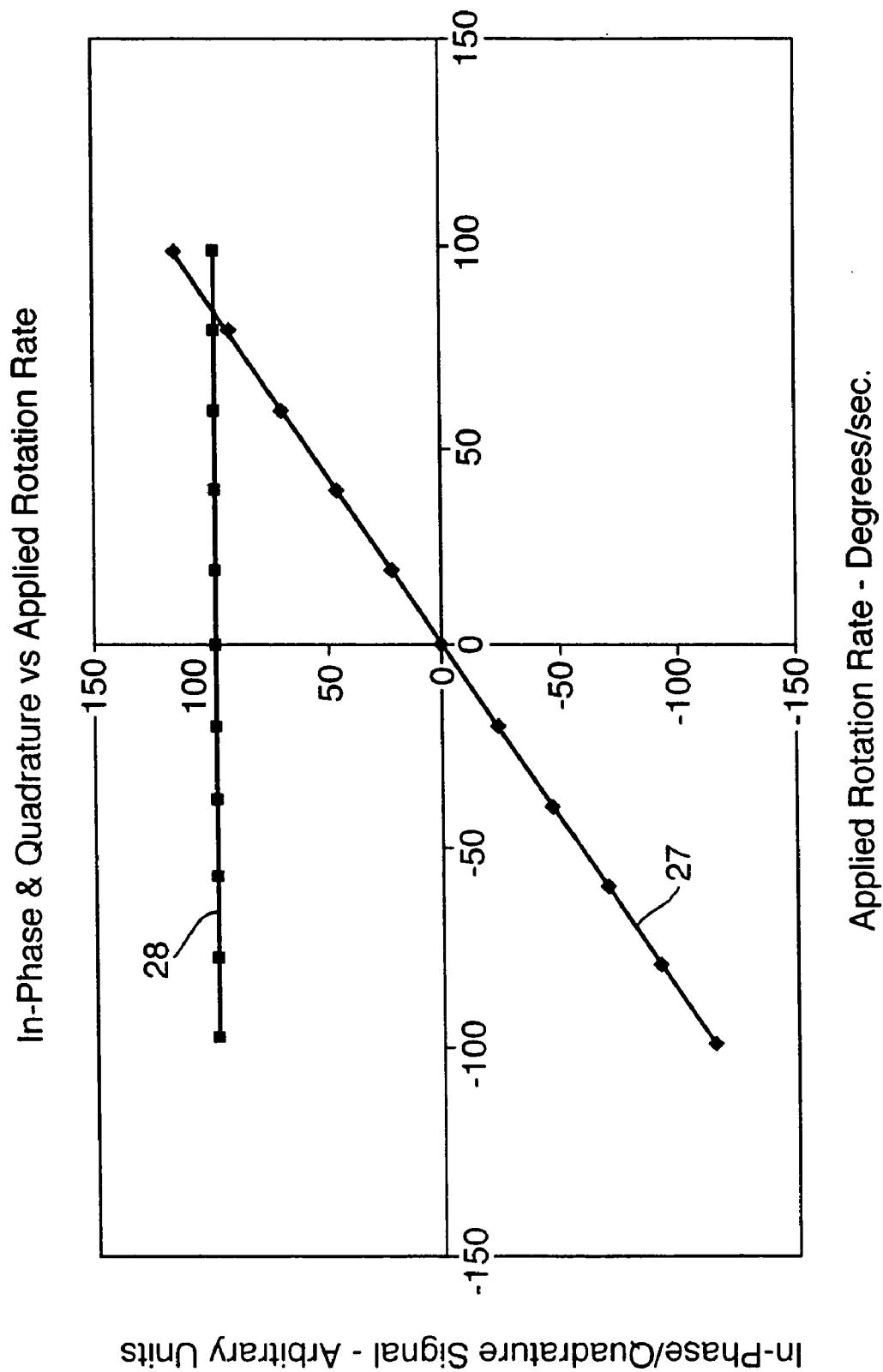
FIG. 7 is a plot of the Vibrating Structure Gyroscope in-phase rate and quadrature outputs for a range of rotation rates applied about the sensitive axis for a conventional Coriolis Vibrating Structure Gyroscope not according to the present invention.

The gyroscope scalefactor information is conventionally obtained by measuring the uncalibrated gyroscope output over a range of applied rotation rates. A typical data set obtained for the in-phase rate channel is shown in FIG. 7. The scalefactor for in-phase is obtained from the slope of the line 27. The equivalent line 28 for the quadrature channel is also shown in FIG. 7. The finite slope of line 28 is indicative of a phase error.

Figure 8:
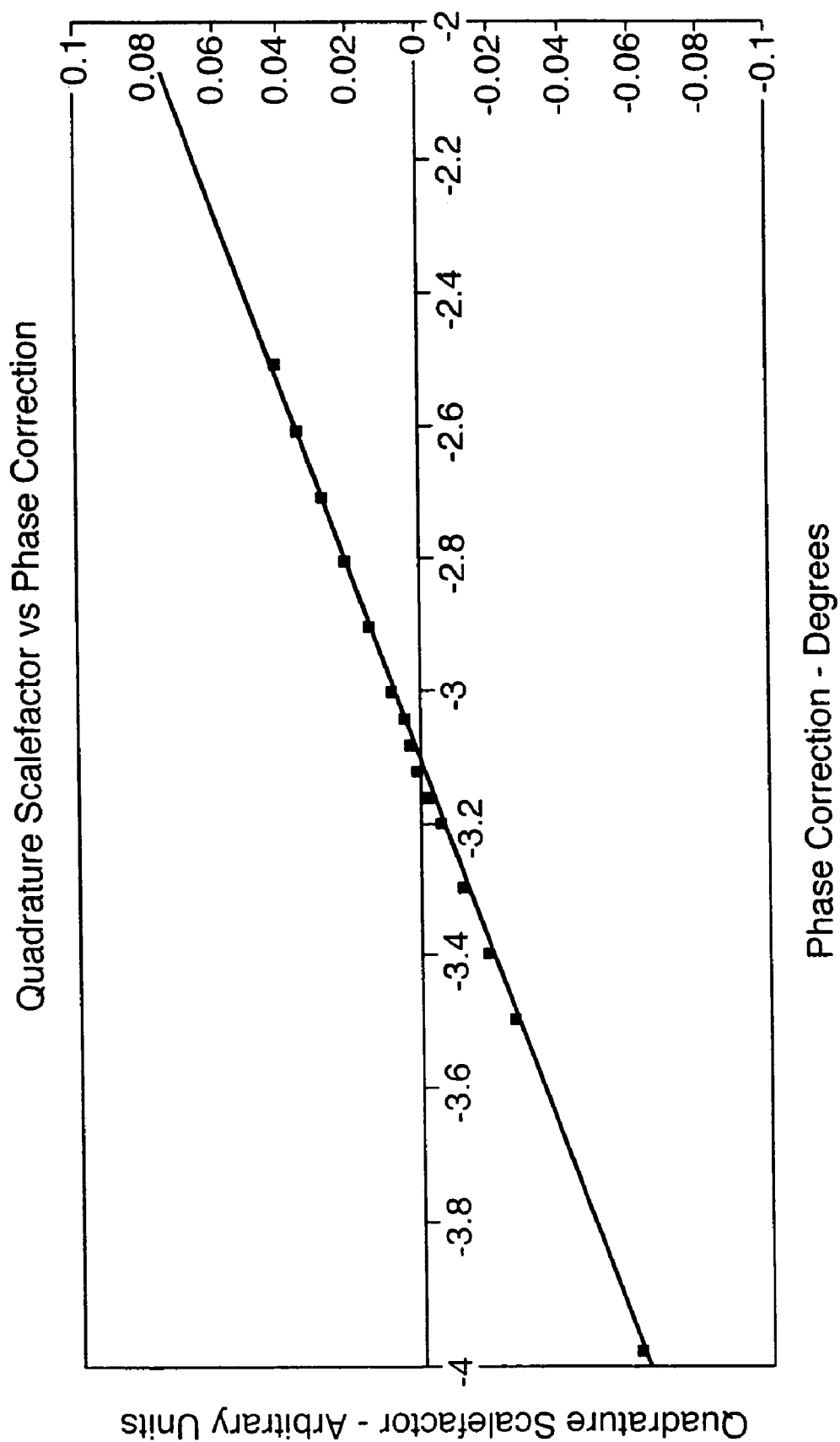
FIG. 8 is a plot of the variation in the quadrature scale factor for a range of phase errors $\phi_E$ for a conventional Coriolis Vibrating Structure Gyroscope not according to the present invention.

The correlation of $SF_{QUAD}$ with $\phi_E$ is shown in FIG. 8. This data was obtained from $SF_{QUAD}$ measurements over a range of values of $\phi_{CORR}$. The offset is attributable to a known hardware phase error. The resolution achievable is clearly visible from this graph and indicates that it is possible to set the phase to an accuracy of <0.05°. This represents over an order of magnitude improvement in the calibration accuracy of this parameter and is equivalent to a reduction in the contribution of the quadrature bias error, $\Omega_{Err}$, from 0.87°/s to <0.087°/s.

Figure 9:
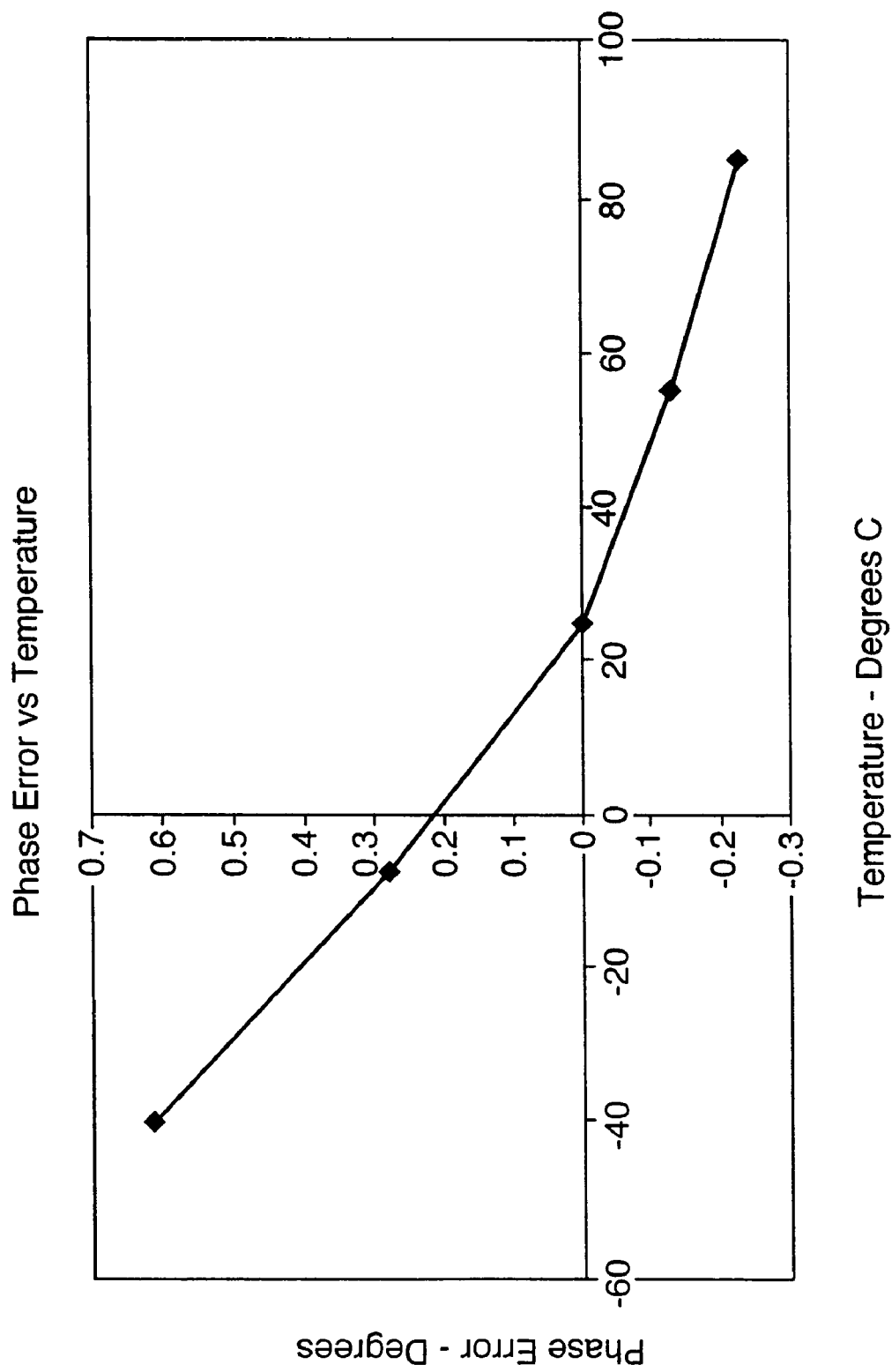
FIG. 9 is a graphical representation of variation of the measured phase error $\phi_E$ over a range of operating temperatures for a conventional Coriolis Vibrating Structure Gyroscope with a constant phase correction applied at room temperature according to the present invention.

An additional advantage when applying the method of the invention in conjunction with digital control electronics is that it is possible to adjust the phase compensation dependent upon the ambient temperature of the gyro. Coriolis gyroscopes are required to operate over a temperature range of −40° C. to +85° C. in typical applications. The phase errors within the hardware are known to vary, in a systematic manner, over this range. The measured variation for a typical automotive sensor is shown in FIG. 9. The phase error for this sensor has been corrected, using the method of the present invention, to be approximately zero at room temperature. In any application requiring high performance it is usual to provide a direct measurement of the sensor ambient temperature. This is typically achieved by incorporating a temperature sensor within, or in close proximity to, the gyroscope. If the temperature variation of the phase error is known then $\phi_{CORR}$ can be adjusted in accordance with the measured temperature using a simple algorithm function in order to maintain $\phi_E \sim 0°$. For high performance applications it is necessary to characterise the sensor performance over the full operating temperature range. The test procedure involves measurement of the bias and scalefactor at a range of temperatures. The quadrature scalefactor, $SF_{QUAD}$, may also be readily recorded as part of this procedure to provide the necessary data on the temperature variation of $\phi_E$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for reducing bias error in a Vibrating Structure Gyroscope having a vibrating structure, primary drive means for putting the vibrating structure into carrier mode resonance, primary pick-off means for sensing carrier mode motion, secondary pick-off means for sensing response mode vibration of the vibrating structure in response to applied rotation rate, secondary drive means for applying a force to control the response mode motion, closed loop primary control loops for maintaining a fixed amplitude of motion at the primary pick-off means and for maintaining the drive frequency at the resonance maximum, and secondary control loops for maintaining a null at the secondary pick-off means, in which the ratio $SF_{QUAD}$ divided by $SF_{IN-PHASE}$ is measured from the secondary control loop to provide a direct measurement of $\sin(\phi_{SD}+\phi_{PPO})$, according to the relationship;

$$SF_{QUAD}=SF_{IN-PHASE} \times \sin(\phi_{SD}+\phi_{PPO})$$

where $SF_{QUAD}$ is the quadrature scalefactor, $SF_{IN-PHASE}$ is the in-phase scalefactor, $\phi_{SD}$ is the phase error in the secondary drive means and $\phi_{PPO}$ is the phase error in the primary pick-off means, the total phase error $\phi_E$ is obtained directly from the measured $\sin(\phi_{SD}+\phi_{PPO})$ according to the relationship;

$$\phi_E = \phi_{SD}+\phi_{PPO}$$

and phase corrections are applied to one of the secondary drive means and the primary pick-off means to reduce the phase error $\phi_E$ and hence the quadrature bias error to enhance the performance of the gyroscope.

2. A method according to claim 1, when used with a gyroscope having a silicon vibrating structure.

3. A method according to claim 2, when used with a gyroscope having a substantially planar, substantially ring shaped vibrating structure.

4. A method according to claim 1, when used with a gyroscope having analogue primary and secondary control loops with variable value capacitors, in which the phase corrections are applied by varying the values of the variable value capacitors in the secondary control loop relating to the secondary drive means and/or the values of the variable value capacitors in the primary control loop relating to the primary pick-off means to adjust $\phi_{SD}$ and/or $\phi_{PPO}$ such that $\phi_E$ is minimised in value.

5. A method according to claim 4, in which in-phase and quadrature signal components are each multiplied by $\sin \phi_{CORR}$ and $\cos \phi_{CORR}$, where $\phi_{CORR}$, is the phase correction, and the effective phase of each in-phase and quadrature channel adjusted according to the summations;

Quadrature$_{CORR}$=Quadrature×Cos $\phi_{CORR}$+In-phase× Sin $\phi_{CORR}$ and In-phase$_{CORR}$=In-phase×Cos $\phi_{CORR}$−Quadrature×Sin $\phi_{CORR}$.

6. A method according to claim 1, when used with a gyroscope having digital primary and secondary control loops, in which the phase corrections equal to $\phi_E$ are applied to the secondary drive means via the secondary control loop in a manner such as to cross-couple in-phase and quadrature drive channels by an amount equal and opposite to the combined effect of the phase errors in the vibrating structure control system.

7. A method according to claim 1, when used with a gyroscope having digital primary and secondary control loops, in which the phase corrections equal to $\phi_E$ are applied to the primary pick-off means by the primary control loop in a manner such as to cross-couple in-phase and quadrature drive channels by an amount equal and opposite to the combined effect of the phase errors in the vibrating structure control system.

8. A method according to claim 7, in which $\phi_{CORR}$ is adjusted in accordance with operating temperature of the gyroscope to maintain $\phi_E$ at a minimised value.

9. A Vibrating Structure Gyroscope having a vibrating structure, primary drive means for putting the vibrating structure into carrier mode resonance, primary pick-off means for sensing carrier mode motion, secondary pick-off means for sensing response mode vibration of the vibrating structure in response to applied rotation rate, secondary drive means for applying a force to control the response mode motion, closed loon primary control loops for maintaining a fixed amplitude of motion at the primary pick-off means and for maintaining the drive frequency at the resonance maximum, and secondary control loops for maintaining a null at the secondary pick-off means, in which the ratio $SF_{QUAD}$ divided by $SF_{IN-PHASE}$ is measured from the secondary control loon to provide a direct measurement of $\sin(\phi_{SD}+\phi_{PPO})$, according to the relationship:

$$SF_{QUAD}=SF_{IN-PHASE} \times \sin(\phi_{SD} \times \phi_{PPO})$$

where $SF_{QUAD}$ is the quadrature scalefactor, $SF_{IN-PHASE}$ is the in-phase scalefactor, $\phi_{SD}$ is the phase error in the secondary drive means and $\phi_{PPO}$ is the phase error in the primary pick-off means, the total phase error $\phi_E$ is obtained directly from the measured $\sin(\phi_{SD}+\phi_{PPO})$ according to the relationship:

$$\phi_E = \phi_{SD}+\phi_{PPO}$$

and phase corrections are applied to one of the secondary drive means and the primary pick-off means to reduce the phase error $\phi_E$ and hence the quadrature bias error to enhance the performance of the gyroscope.

* * * * *